Jan. 11, 1938. D. F. LYMAN ET AL 2,105,250
WARNING SIGNAL FOR DISSOLVING SHUTTERS
Filed Aug. 11, 1936
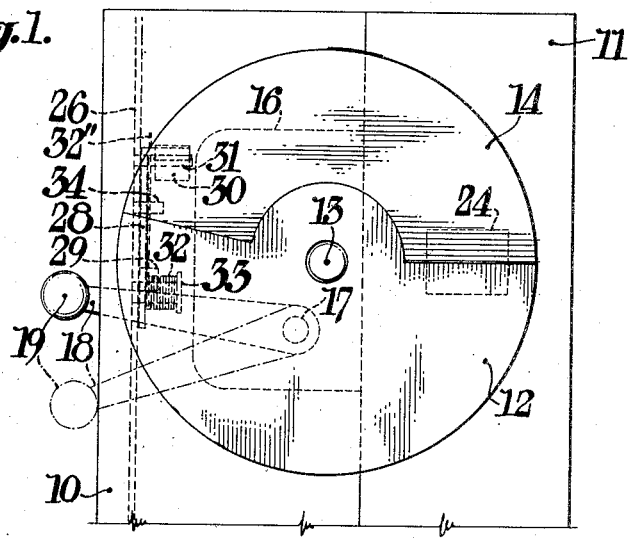
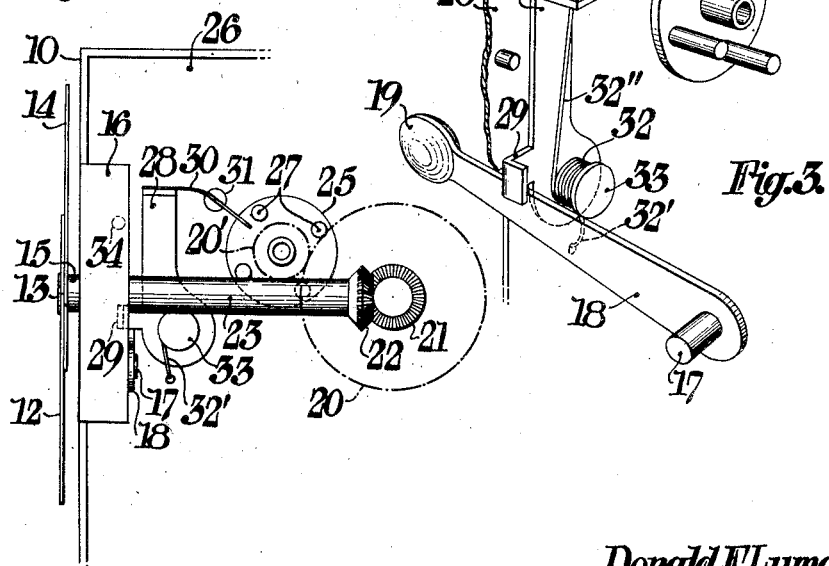
Donald F. Lyman &
Joseph Stoiber,
INVENTORS:
Newton M. Perrins
George A. Gillette Jr.
ATTORNEYS.

Patented Jan. 11, 1938

2,105,250

UNITED STATES PATENT OFFICE

2,105,250

WARNING SIGNAL FOR DISSOLVING SHUTTERS

Donald F. Lyman and Joseph Stoiber, Rochester, N. Y., assignors, by mesne assignments, to Eastman Kodak Company, Jersey City, N. J., a corporation of New Jersey Application August 11, 1936, Serial No. 95,388

10 Claims. (Cl. 88—19.3)

The present invention relates to a warning signal for motion picture apparatus and more particularly to a warning signal which becomes operative upon movement of a dissolving shutter to closed position.

For more advanced types of motion pictures, it is often desirable to make lap dissolves, double exposures and other trick effects. Such effects may be obtained by the use of dissolving shutters which are well known in the motion picture art. As an incident to obtaining these effects the dissolving shutter may be gradually closed and must be completely closed during rewinding of the film for its second passage through the camera.

The primary object of the present invention is the provision of a warning signal which becomes operative only when the blades of a dissolving shutter are moved to closed position to warn the operator that the shutter is closed in the event of resuming normal operation of the apparatus or to reassure the operator that the shutter is closed during rewinding of the film for trick effects.

Another object of the invention is the provision of an audible warning signal which is moved into operative position by the blade operating member of the dissolving shutter and which is normally maintained in inoperative position.

A still further object of the invention is the provision of an audible warning signal including a plurality of projections or protuberances upon one of the standard movable parts of the driving mechanism.

Other and further objects of the invention will be suggested to those skilled in the art by the description which follows.

The above and other objects of the invention are attained by a warning signal which includes a movable member having a part or projection in the path of the operating member for relatively moving the blades of the dissolving shutter. Said member carries a flexible tongue or a leaf spring which may be moved into engagement with a plurality of projections upon a movable part of the driving mechanism. Said movable member is normally held in an inoperative position against a stop by a resilient means.

Reference is hereby made to the accompanying drawing wherein like reference characters designate similar elements and wherein:

Fig. 1 is a front elevation of a dissolving shutter with the elements of the warning signal according to the invention indicated in dotted lines.

Fig. 2 is a side elevation of the dissolving shutter and the warning signal of the invention.

Fig. 3 is a perspective of the audible warning signal according to the invention and illustrates the association of said signal with the operating member for the dissolving shutter.

Although the warning signal illustrated and described herein is of the audible type, it is to be understood that such signal may also be of the visible or feelable type without departing from the scope of our invention.

Referring now to Fig. 1 of the drawing, the dissolving shutter is mounted in front of the apparatus casing which may comprise a mechanism housing 10 and a film magazine 11. The dissolving shutter is of a conventional type and for that reason has not been illustrated in all its details but merely those elements of said dissolving shutter as are necessary for an understanding of the invention have been shown. The shutter blade 12 is mounted upon a shaft 13 and the other shutter blade 14 is mounted upon a sleeve 15. Said shaft 13 and sleeve 15 extend into a casing 16 in which the gears, sleeves with helical slots, or other well known arrangements permitting relative movement of the shutter blades are enclosed. A stud 17 extends into said casing 16 and is connected to an operating member 18 which has a finger portion 19.

The driving mechanism for said dissolving shutter includes a pinion gear 20 which is driven directly or indirectly by a suitable prime mover, such as a spring motor and includes a pair of miter gears 21 and 22. A driving shaft 23 has one end extending into the casing 16 and on its other end carries the miter gear 22.

The driving mechanism by rotation of shaft 23 and through the connections within casing 16 will rotate shutter blades 12 and 14 in the well known manner and over the exposure aperture 24 of the apparatus. The relative position of the shutter blades 12 and 14 may be altered by movement of the operating member 18. According to the arrangement herein contemplated, when the operating member 18 is moved to its uppermost position, as indicated by the full and dotted lines of Fig. 1 and as illustrated in Fig. 3, the shutter blades 12 and 14 are closed, also as illustrated in Fig. 1. Said operating member 18 may be moved to various other positions, such as the position indicated by dot-dash lines of Fig. 1, in which said shutter blades 12 and 14 will be relatively displaced with respect to each other. The specific details of one type of dissolving shutter which is particularly adaptable to the present invention are disclosed in Wittel U. S. Patent No. 1,912,749, issued on June 6, 1933, for Improvements in a motion picture camera.

The driving mechanism may also include a movable part 25 which is driven by a pinion gear 20′ meshing with the aforementioned pinion gear 20. Such a movable part may be any rotating member of the driving mechanism which is normally provided within apparatus of this type.

The warning signal of the invention may be located at any convenient point within or on the apparatus but has been illustrated as being mounted upon a mechanism plate 26. As before mentioned the warning signal may be of any type but an audible warning signal is preferred because an apparatus of this advanced character is generally quite complicated so that the operator's hands and eyes are well occupied. Said audible warning signal includes a plurality of projections or protuberances 27 mounted upon the movable part 25. The audible warning signal also includes a movable member and for purposes of illustration this movable member is shown as a pivoted lever 28 having a lateral projection 29 to which a flexible tongue or leaf spring 30 is attached. The lateral projection 29 extends into the path of movement of the operating member 18 for a purpose which will be later described. The flexible tongue or leaf spring 30 may be guided into engagement with the projections 27 by a slotted stud 31.

A resilient means for maintaining the audible warning signal in an inoperative position may comprise a coil spring 32 encircling the post 33 upon which lever 28 is pivoted and has one end 32′ anchored in the mechanism plate 26, while the other end 32″ of coil spring 32 bears against lever 28 to urge the same in a counter-clockwise direction, see Fig. 3. The action of the resilient means to move the audible warning signal to an inoperative position is limited by a stop 34 mounted upon mechanism plate 26.

The operation of the audible warning signal of the invention is as follows: When the apparatus is being operated with the dissolving shutter blades 12 and 14 in a relatively displaced position, the operating member 18 and finger portion 19 are in some position, such as indicated by the dot-dash lines in Fig. 1. Under these conditions the resilient means, such as coil spring 32 is holding the pivoted lever 28 against the stop 34, while the end of the flexible tongue or leaf spring 30 is out of engagement with the projections 27 so that the warning signal is silent. However, when the operating member 18 and finger portion 19 are moved so that the shutter blades 12 and 14 are in closed position, then the operating member 18 strikes against the lateral projection 29 on pivoted lever 28, said pivoted lever 28 is moved in a clockwise direction against the action of coil spring 32 and its end 32″. When the pivoted lever 28 so moves in a clockwise direction the flexible tongue or leaf spring 30 is moved through the slotted stud 31 and is moved so that the end of said tongue or spring 30 comes into engagement with the projections 27 on the movable part 25. The successive engagements and dis-engagements of the projections 27 with the end of tongue or spring 30 will create a clicking or buzzing noise sufficient to warn the operator that the shutter blades are closed.

As a result, if the operator forgets that the blades 12 and 14 of the dissolving shutter are in closed position and then endeavors to operate the apparatus, he will immediately be warned that the shutter blades are closed and that no light is passing through the exposure aperture 24. On the other hand, if the operator is rewinding the film as an incident to some trick effect, the movable part 25 will be rotated in the opposite direction and will also cause the clicking or buzzing by engagement of the projections 27 with the tongue or spring 30. Under these conditions the audible signal will be reassuring in advising the operator that the shutter blades are closed and that the film during this rewinding operation is not being fogged.

Since the warning signal of the invention may be modified in its construction or in its type, the present disclosure is to be construed in an illustrative sense and limited only by the following claims.

Having now particularly described our invention what we desire to secure by Letters Patent of the United States and what we claim is:

1. In a motion picture apparatus, the combination with a dissolving shutter including a pair of blades which may be moved relatively to an open position and to a closed position, and an operating member connected to said blades and for relatively moving the same, of a signal means movably mounted and normally inoperative, and a selective connection between said operating member and said signal means and operative to move said signal means into an operative position only when said operating member is moved to a position corresponding to the closed position of said blades.

2. In a motion picture apparatus, the combination with a dissolving shutter including a pair of blades which may be moved relatively to an open position and to a closed position, and an operating member connected to said blades and for relatively moving the same, of an audible signal mounted for movement into an operative position but normally in an inoperative position, and a selective connection for movement of said signal into said operative position by said operating member and operative only when said operating member is moved to a position corresponding to the closed position of said blades.

3. In a motion picture apparatus, the combination with a dissolving shutter including a pair of blades which may be relatively moved to an open position and to a closed position, an operating member connected to said blades and for so relatively moving the same, and a driving mechanism for moving said shutter and including a movable part, of an audible signal means pivotally mounted and normally in an inoperative position but adapted to be moved into operative position with respect to said movable part of the driving mechanism, and a selective connection operative for movement of said signal into operative position by said operating member only when said operating member is moved to a position corresponding to the closed position of said blades.

4. In a motion picture apparatus, the combination with a dissolving shutter including a pair of blades which may be relatively moved to an open position and to a closed position, an operating member connected to said blades and for so relatively moving the same, and a driving mechanism for moving said shutter and including a movable part, of an audible signal means including portions on said movable part of the driving means and including a movable member normally out of engagement with said portion but moved into such engagement, for creating an audible signal, by said operating member only when said operating member is moved to a position corresponding to the closed position of said blades.

5. In a motion picture apparatus, the combination with a dissolving shutter including a pair of blades which may be relatively moved to an open position and to a closed position, an operating member connected to said blades and for so relatively moving the same, and a driving mechanism for moving said shutter and including a movable part, of a plurality of projections on said movable part of the driving means, and a movable member including a flexible tongue for engaging said projections and creating an audible signal, and also including a part engaged by said operating member to move the tongue of said movable member into engagement with said projections when said operating member is moved to close said blades.

6. In a motion picture apparatus, the combination with a dissolving shutter including a pair of blades which may be relatively moved to various open positions and to a closed position, an operating member connected to said blades and for so relatively moving the same, and a driving mechanism for driving said shutter and including a movable part, of a plurality of protuberances on said movable part of the driving means, and a movable member including a leaf spring for engaging said protuberances and for creating an audible signal and also including a projection adapted, upon movement of said operating member to close said blades, to be engaged by said operating member and to move said leaf spring into engagement with said protuberances.

7. In a motion picture apparatus, the combination with a dissolving shutter including a pair of blades which may be relatively moved to various open positions and to a closed position, an operating member connected to said blades and for so relatively moving the same, and a driving mechanism for driving said shutter and including a movable part, of a plurality of protuberances on said movable part of the driving means, a movable member including a flexible tongue for engaging said protuberances, a projection upon said movable member in the path of said operating member, and a resilient means connected to said movable member for normally maintaining said tongue out of engagement with said protuberances but adapted to be overcome by movement of said movable member and of said tongue into engagement with said protuberances.

8. In a motion picture apparatus, the combination with a dissolving shutter including a pair of blades which may be relatively moved to various open positions and to a closed position, an operating member connected to said blades and for so relatively moving the same, and a driving mechanism for driving said shutter and including a movable part, of a plurality of protuberances on said movable part of the driving means, a movable member including a flexible tongue for engaging said protuberances, a projection upon said movable member in the path of said operating member, a stop adjacent said movable member, and a resilient means connected to said movable member and for normally maintaining said movable member against said stop but adapted to be overcome by movement of said operating member to close said blades and to move said movable member away from said stop and said flexible tongue into engagement with said protuberances.

9. In a motion picture apparatus, the combination with a dissolving shutter including a pair of blades which may be relatively moved to various open positions and to a closed position, an operating member connected to said blades and for so relatively moving the same, and a driving mechanism for driving said shutter and including a rotatable part, of a plurality of projections on said rotatable part of the driving means, a movable member including a flexible tongue for engaging said projections, a selective connection operated by said operating member only when said blades are in closed position to move said flexible tongue into engagement with said projections, and a guide means engaging said flexible tongue and for directing the same into engagement with said projections.

10. In a motion picture apparatus, the combination with a dissolving shutter including a pair of blades which may be relatively moved to various open positions and to a closed position, an operating member connected to said blades and for so relatively moving the same, and a driving mechanism for driving said shutter and including a rotatable part, of a plurality of projections on said rotatable part of the driving means, a movable member including a flexible tongue for engaging said projections, a selective connection operated by said operating member only when said blades are in closed position to move said flexible tongue into engagement with said projections, and a stud provided with a slot which receives said flexible tongue and for directing said tongue in its movement into engagement with said projections.

DONALD F. LYMAN.
JOSEPH STOIBER.